(No Model.)
E. P. CLAY.
HARROW.
No. 312,255. Patented Feb. 17, 1885.
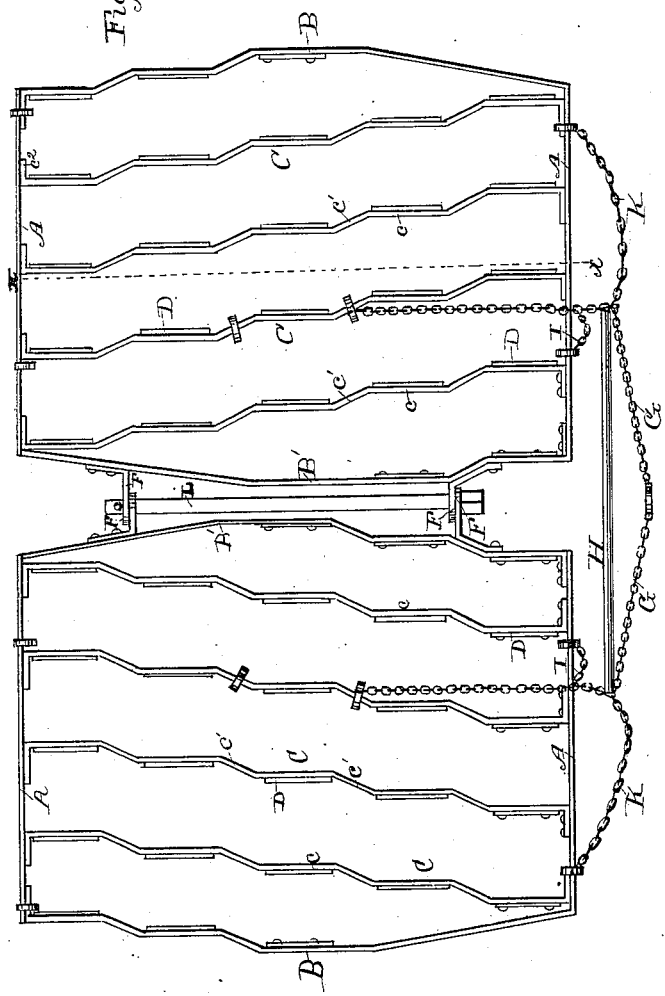
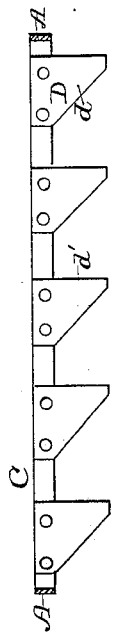
Witnesses
H. E. Bliss
H. Burke
Inventor:
Edward P. Clay
by Doubleday & Bliss
attys.

UNITED STATES PATENT OFFICE.

EDWARD P. CLAY, OF MASSILLON, OHIO.

HARROW.

SPECIFICATION forming part of Letters Patent No. 312,255, dated February 17, 1885.

Application filed May 26, 1884. (No model.)

*To all whom it may concern:*

Be it known that I, EDWARD P. CLAY, a citizen of the United States, residing at Massillon, in the county of Stark and State of Ohio, have invented certain new and useful Improvements in Harrows, of which the following is a specification, reference being had therein to the accompanying drawings.

Figure 1 is a top view of a harrow embodying my improvements. Fig. 2 is a section on the line $x\ x$, Fig. 1.

The frames or sections which carry the cutters or teeth are substantially rectangular in form, and are made from comparatively thin bar-iron. Two of these sections are usually hinged together, though for some purposes a single section may be used separately from the other.

The inventions which I desire to secure in this case relate to the construction of the frame, the mode of attaching the teeth, and also to the draft devices, having claimed certain of the features herein shown in another application, No. 132,799, filed May 26, 1884.

Referring to the drawings, each frame consists of front and rear cross-bars, A A, side bars, B B', and intermediate longitudinal bars C, extending from one bar A to the other, to which the teeth are attached. The entire frame-work is made from thin metal bars bolted or riveted together, which makes a harrow-frame of great strength and rigidity without undue weight. The teeth are so mounted that no two shall cut in the same path—that is, they are so mounted that no one tooth lies directly in front of any other one. To effect this arrangement I make each tooth-supporting bar C zigzagged—that is, having its parts situated upon a broken line, the general direction of the bars C being oblique across the frame. The part $c$ to which the tooth is attached lies transverse to the bars A A, and parallel with the line of draft, thus causing the tooth to travel straight through the earth and not obliquely. The parts $c'$ of the bar lying between the tooth-supporting parts $c$ extend rearwardly upon an oblique line, which so relates the parts $c$ one to another that no two teeth upon the same bar can lie in the same vertical plane. By making the parts $c'$ of the bars longer or shorter, or by changing their angle relatively to the bars A, the teeth may be caused to lie farther apart or nearer together transversely of the frame as the work intended to be performed may require. I so arrange the bars C that the forward tooth upon one bar is a little to one side of the rear tooth on the adjacent bar, by which arrangement I thoroughly pulverize the whole surface of the ground passed over by the harrow, and that with the fewest number of teeth possible. The bars C are provided at each end with a short arm or part, $c^2$, bent at right angles to the parts $c$, which are riveted or otherwise secured to the inner faces of end bars, A. Should it be found desirable to further brace the bars C intermediately between the ends, I may do so, but this I have not found necessary.

I have shown a portion of each side bar B B' stepped or made zigzagged to receive teeth D, the remaining part of the bars being straight.

When the harrow moves in the direction indicated in Fig. 1, the forward parts of the bars B' are adapted to receive the teeth, and the bars B are stepped to receive the teeth at their rear ends. The teeth D are of the form of a right-angle triangle the base of which lies against and is attached to the bars C. The other edges, $d$ and $d'$, are sharpened, to facilitate their cutting through the soil.

When the harrow is dragged forward, so that the edge $d$, which is the hypotenuse of the angle, first cuts into the soil, the teeth do not enter so deeply into the ground as when the draft is reversed and the edge $d'$ is forward. The two sections or frames are hinged together by means of plates F F, secured to the outer faces of side bars B', and a rod or long bolt, L, passing through apertures in plates F. During transportation, or when the harrow is not in use, one section or frame may be folded back upon the top of the other, as will be readily seen. There is a tendency upon the part of the harrow-frames having the tooth-carrying bars C arranged diagonally, as I have shown, to twist as the teeth are being dragged through the soil, the rear end of each bar tending to follow directly behind, instead of to one side, of the parts in front. This I overcome or neutralize by inclining the bars upon the two frames oppositely, and joining them at the ends of the frame where the bars C converge, to prevent spreading, the hinge-rod F serving this purpose when the parts are connected, as shown in the drawings.

I have shown a simple draft device, which may be easily changed from one end of the harrow to the other, and which operates very advantageously. It consists of two chains, G G, one attached to each frame, connected together at their free ends by means of a ring or clevis, to which the single or double tree may be attached. Each chain G is connected to one of the bars C, preferably the second from the side bars, B'. The bar C is perforated through one of the parts $c'$, in which perforation is inserted a ring, into which the chain G may be hooked; or the chain may be passed through or fastened in the aperture directly. H is a bar or strut, which holds apart the chains. Its ends are made pointed, so that they may pass partially through the links of the chain, by which it is held from slipping out. This bar, by holding apart the chains, causes the draft of the team to be applied directly on the line of travel of the harrow, and avoids the twisting strain which otherwise would be exerted.

In order to assist in turning the harrow, I combine with the chains G G two other shorter chains, I and K. The shorter chain I is connected to the cross-bar A between the point where the chain G crosses it and the side bar, B', preferably between the first and second bars C, and joins chain G a little in front of bar A. The other chain, K, is somewhat longer, and is connected with the frame near its front outer corner, and joins the chain a little in advance of where chain I joins. When the team is moving straight ahead, the chains I and K are slack, the entire draft being upon chains G; but when it becomes necessary to turn the harrow the outer chain, K, on one section and the inner chain, I, on the other are drawn taut, which causes the harrow to be easily turned. I provide each end of the frame with like apertures or other means whereby the chains may be connected, so that the team can be changed from one end to the other by simply unfastening the chains G I K from their respective attachments at one side and attaching them correspondingly on the other end.

Under some circumstances I may use the harrow without the strut or bar H; but I prefer to use it as shown.

I am aware of the fact that harrows have been heretofore constructed with tooth-supporting bars arranged on lines inclined to the line of draft, those of one side being inclined oppositely to those upon the other.

What I claim is—

1. In a harrow, the combination of two opposing frames, each frame being constructed with the front bars, A A, the outer and inner side bars, B B', forming with the end bars, A A, right angles approximately, and the intermediate bars, C C, inclined to the line of draft, those in one section being inclined oppositely to those in the other, said bars extending continuously from one end bar to the other, the side bars and the intermediate bars being zigzagged, and the two frames being united by a central hinge, substantially as set forth.

2. The combination, with the two-part harrow hinged together on a line parallel to the line of draft, of the flexible draft devices I, K, and G, attached to each part or frame of the harrow, the part G being secured to the harrow-frame nearly upon its central line, and the parts I and K secured near the corners of the frame, whereby the draft is applied to the central parts of the harrow when the latter is being drawn on straight lines, and whereby the draft can be applied more nearly at the corners when the harrow is being turned, substantially as described.

3. The combination, with a two-framed harrow having the frames hinged together on a line parallel to the line of travel, of draft devices consisting of chains G, attached to the frames upon nearly their central lines, the chains I and K, attached to the frames near their corners, and the rigid strut-brace H, whereby the draft is applied to the frames upon nearly their central lines and parallel with the travel of the harrow when it is being drawn on straight lines, and whereby the draft is applied to the frames near their corners when the harrow is being turned, substantially as set forth.

In testimony whereof I affix my signature in presence of two witnesses.

EDWARD P. CLAY.

Witnesses:
　JACOB P. FAWCETT,
　HENRY FISHER.